June 5, 1928.  1,672,702
J. M. WEED
WELDING APPARATUS
Filed Dec. 11, 1923
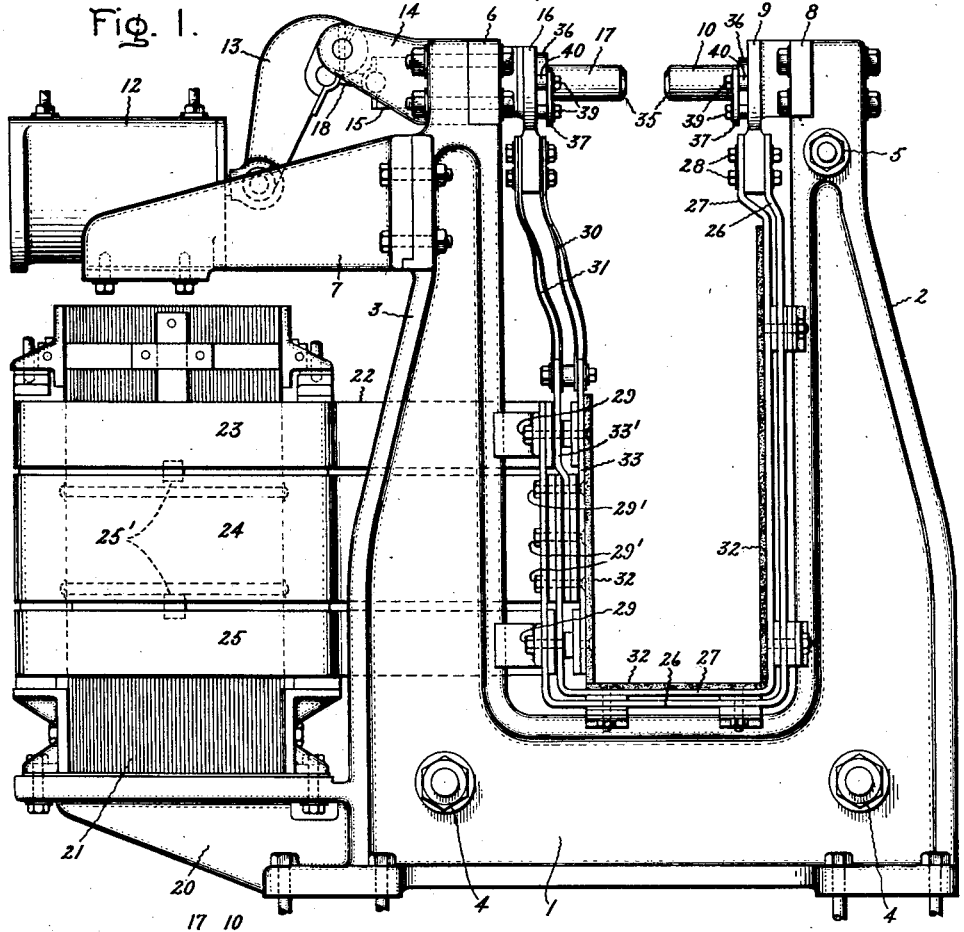
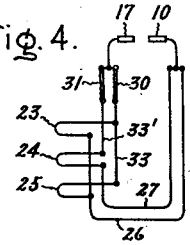
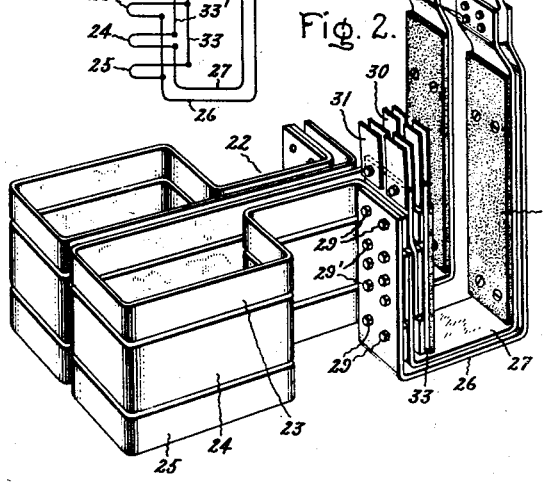
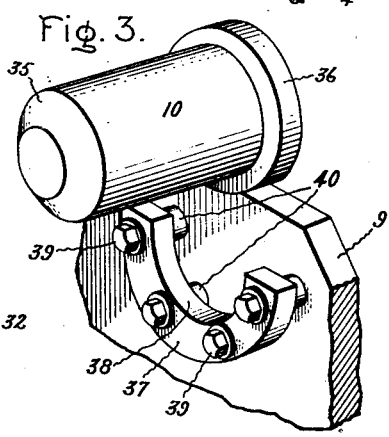
Inventor:
James M. Weed,
by *Alexander F. [signature]*
His Attorney.

Patented June 5, 1928.

1,672,702

UNITED STATES PATENT OFFICE.

JAMES M. WEED, OF SCHENECTADY, NEW YORK, ASSIGNOR TO GENERAL ELECTRIC COMPANY, A CORPORATION OF NEW YORK.

WELDING APPARATUS.

Application filed December 11, 1923. Serial No. 680,019.

My invention relates to electric welding and particularly to apparatus for spot welding comparatively thick plates or structural parts which require the use of very large currents.

An object of my invention is to provide an improved spot welding machine of this character in which the circuit of the welding current shall be characterized by having a relatively small reactive drop.

My invention will be better understood by reference to the accompanying specification and drawing and its scope will be pointed out in the appended claims.

Figure 1 is a side elevation of a welding machine involving my invention; Fig. 2 is a perspective view of the secondary winding of the transformer and the leads connecting it with one of the electrodes; Fig. 3 is a fragmentary perspective view showing how the electrodes are detachably connected with the terminal plates; and Fig. 4 is a diagram showing the circuit connections of one side of the secondary winding to the electrodes.

Referring to the drawing, the frame of the machine comprises two similar members, the one being hidden behind the other in Fig. 1, and each member has a base portion 1 from which rise two jaws 2 and 3. The two base portions are secured together by bolts 4 and the two jaws 2 are secured together by a bolt 5. The two jaws 3 are spaced apart but connected by a yoke 6 and by a bracket 7, each of which is securely bolted to the jaws 3 by bolts as shown. The jaws 2 support a yoke 8, which is insulated therefrom, and to which is attached, by means not shown, a terminal plate 9 carrying electrode 10. The bracket 7 supports an air cylinder 12 having a piston pivoted to lever 13 which is fulcrumed on a pair of projections 14 extending rearwardly from the yoke 6. A slide 15 mounted in the yoke 6, between the projections 14, has attached to its forward end, by means not shown, a terminal plate 16 carrying electrode 17. Connecting the rear end of the slide 15 with the lever 13 is a link 18. By the structure thus described it will be seen that by the admission of air pressure to the cylinder 12 the electrode 17 is forced toward the electrode 10.

A bracket 20, shown integral with the base portions 1 of the frame, supports the transformer 21. The secondary winding of this transformer is shown in Fig. 2, detached from the core and the primary winding in order to more clearly illustrate its construction and its connecting leads. The transformer illustrated is of the core type and each leg is surrounded by three distinct secondary turns or portions, the material forming each portion being extended to form leads 22 which pass through the space between the jaws 3. All of these secondary portions are connected in parallel at the electrodes, and since the manner of connecting them is similar for the two legs of the transformer, a detailed description of the connection will be given for but one of the legs. It may at once be stated that the reason for using several distinct parallel portions instead of one single turn of the same total cross section is to reduce the losses due to unequal distribution and out of phase components of current. These losses are variously designated as due to eddy, stray or circulating currents.

It is a well known fact that where three conductors lying side by side are connected in parallel, as is the case with secondary portions 23, 24 and 25, the reactance of the middle conductor, as 24, is greater than those of the two outer conductors, as 23 and 25. If the outer conductors are symmetrical, and in the case of transformer windings this symmetry must exist with respect to both primary and secondary, their reactances will be equal. This difference in reactance, existing in this case between the middle portion of the secondary and the two end portions, is responsible for the losses referred to above, and will cause extra loss and heating, even when the secondary is composed of several distinct parallel parts, unless the differences in reactance are compensated for in some way. In the present instance these differences are partly, if not completely, compensated by so constructing the leads running to the electrodes as to have corresponding differences in reactance, using a lead of higher reactance for a portion of lower reactance and vice versa.

For this purpose, advantage is taken of the fact that when two conductors connected in parallel from loops enclosing the common area, with one of the conductors outside of the other, the outer conductor will possess the greater reactance. In the present instance, two separate leads, 26 and 27, tend to form loops so arranged one within the other and extend around the opening formed by the jaws to the outermost electrode. There they are secured to the terminal plate 9 by bolts 28, to which plate the electrode 10 is also attached. At their opposite ends, lead 26, which has the greater reactance, is connected to extensions of the secondary portions 23 and 25, whose reactances are equal to each other but less than that of portion 24, by bolts 29, while lead 27 is connected to the extension of 24 by bolts $29^1$. The extensions of the ends of portions 23 and 24 which are not connected to 26 are connected by connector 33 to flexible leads 30, while the end of portion 24 which is not connected to 27 is connected by connector $33^1$ to flexible leads 31. Flexible leads 30 and 31 are in turn connected to opposite faces of the terminal plate 16.

Since the secondary portions 23 and 25 are both connected to the same leads, 26 and 30, while secondary portion 24 is connected alone to leads 27 and 31, which are of the same size as 26 and 30 respectively, it should be noted that the widths of 23 and 25 are only one-half that of 24, and consequently their combined cross sectional area is equal to that of 24.

Suitable insulation is provided between the various connection plates to confine the currents to the paths described. Flat plates 32 of insulation are shown covering the inner lead 27 and the connector plate 33 to protect these parts from injury and prevent short circuits through the work. In order to produce a simple, compact and rigid structure, and reduce the number of parts, bolts 29 and $29^1$ are common to several leads and secondary conductors as clearly shown on the drawing. These bolts are of course insulated by suitable washers and bushings to avoid short circuits. T-shaped space blocks of insulating material $25^1$ serve to space the secondary portions 23, 24 and 25 from each other and from the primary winding beneath.

The connection between the electrodes and the secondary portions 23, 24 and 25 is more simply shown in Fig. 4.

As already stated above, the secondary windings surrounding the two legs of the transformer core are similar to each other and are similarly connected to the electrode terminal plates. With the construction thus described, it will be seen that while the secondary winding of the transformer is subdivided to reduce the eddy current losses, the difference in reactances of the subdivisions is balanced by the unequal reactances of the conductors leading to the electrodes.

In order to minimize the power losses and heating due to the heavy magnetic field produced by the welding current, the frame castings and all other metal parts except the core of the transformer, the current conductors and the air cylinder, which latter is well removed from the magnetic field of the machine, are made of non-magnetic metals.

It will be noted that the machine is constructed to stand with the jaws extending up vertically. This facilitates handling the work which, in the case of a machine like the present, would ordinarily be swung into and out of place by means of a crane.

To further facilitate placing the work in the throat of the machine the electrodes 10 and 17 are detachably connected to the jaws to permit their removal from the machine at such times.

Each electrode has a body or shank portion 35 and a terminal flange 36. The terminal plate 9 has secured to one face thereof but spaced therefrom a plate 37 having a semicircular recess 38 therein of a size to receive the shank portion of the electrode. By providing the attaching bolts 39 with sleeves 40 of a length slightly greater than the thickness of the flange 36, the plate 37 may be secured to the terminal plate to provide a socket into which the electrode is normally held by gravity and from which it is readily removed.

With spot welding machines having a comparatively short reach adapted for welding work of small linear dimensions little attention need be given to the effect of the work on the reactance of the secondary circuit but as the reach of the machine and the size of the work increase the reactance difficulties greatly increase, this being particularly true where the work comprises large masses or sheets of high permeability, such as iron and steel, providing low reluctance paths for the flux of the welding current. In a machine like the present, which has been constructed to have a reach of four feet and with which it has been found possible to weld plates up to three quarters of an inch in thickness, taking 40,000 to 50,000 amperes at a frequency of 25 cycles, the reactance difficulties present serious problems. By the above-described arrangement, however, I have been able to materially reduce these difficulties making easy the successful welding of plates larger than heretofore had been attempted.

While I have described only one embodiment of my invention, I do not wish to be limited to the particular form shown and described as it will be apparent that many modifications thereof may be made without departing from the scope of my invention as set forth in the appended claims.

What I claim as new and desire to secure by Letters Patent of the United States, is,—

1. In an electric spot welding apparatus, a pair of electrodes, a transformer for supplying current to said electrodes, said transformer having a secondary comprising a plurality of conductors with unequal reactances, and having a plurality of leads with unequal reactances for connecting said secondary with said electrodes, the leads with the larger reactances being connected in circuit with the secondary conductors having the smaller reactances.

2. In an electric spot welding apparatus, a pair of electrodes, a transformer for supplying current thereto having its secondary comprising a plurality of conductors of unequal reactances and means connecting said conductors with said electrodes for compensating for the inequality of the reactances of said conductors.

3. In a spot welding machine, a pair of electrodes, a transformer for supplying a welding current thereto, said transformer having a secondary comprising two outer sections connected together to form circuits in parallel and an intermediate section, and a pair of leads forming loops, the one loop being within the other, for connecting said secondary sections with said electrodes, the lead forming the inner loop being connected with the intermediate section of the secondary, and the lead forming the outer loop being connected with the outer sections.

In witness whereof, I have hereunto set my hand this 10th day of December, 1923.

JAMES M. WEED.